US010602414B2

(12) United States Patent
Chakraborty et al.

(10) Patent No.: US 10,602,414 B2
(45) Date of Patent: *Mar. 24, 2020

(54) METHODS AND SYSTEM FOR PROVIDING MULTIPLE VIDEO CONTENT STREAMS OVER DIFFERENT COMMUNICATION NETWORKS

(71) Applicant: AT&T Intellectual Property I, L.P., Atlanta, GA (US)

(72) Inventors: Soumyajit Chakraborty, Somerset, NJ (US); Stephen Francis Triano, Hillsborough, NJ (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,727

(22) Filed: Jan. 18, 2019

(65) Prior Publication Data

US 2019/0159091 A1    May 23, 2019

Related U.S. Application Data

(63) Continuation of application No. 15/250,361, filed on Aug. 29, 2016, now Pat. No. 10,231,159.

(51) Int. Cl.
*H04W 36/14* (2009.01)
*H04W 4/02* (2018.01)
(Continued)

(52) U.S. Cl.
CPC ......... *H04W 36/14* (2013.01); *H04L 41/0896* (2013.01); *H04W 4/023* (2013.01);
(Continued)

(58) Field of Classification Search
None
See application file for complete search history.

(56) References Cited

U.S. PATENT DOCUMENTS

| 6,543,053 B1 | 4/2003 | Li et al. |
| 7,865,567 B1 | 1/2011 | Hendricks et al. |
| (Continued) |

FOREIGN PATENT DOCUMENTS

| EP | 2819345 | 12/2014 |
| WO | 2015150736 | 10/2015 |

OTHER PUBLICATIONS

"Eliminating Data Redundancies", Technical Brief—Release 1.0, Gilat Satellite Networks, Jun. 2015, 11 pages.
(Continued)

*Primary Examiner* — Christine T Duong
(74) *Attorney, Agent, or Firm* — Guntin & Gust, PLC; Atanu Das

(57) ABSTRACT

Aspects of the subject disclosure may include, for example, receiving video content streams from multiple source mobile devices and identifying that the video content streams pertain to a same event. Additional aspects may include identifying end mobile devices for the video content streams and determining a portion of the end mobile devices are coupled to one communication network and another communication network. Further aspects can include identifying a predicted traffic pattern on the first communication network based on the multiple video content streams pertaining to the same event and that the portion of the multiple end mobile devices are communicatively coupled to the first communication network. Additional aspects may include transmitting a portion of the video content streams across the first communication network and transmitting another portion of the video content streams across the second communication
(Continued)

network according to the predicted traffic pattern. Other embodiments are disclosed.

20 Claims, 8 Drawing Sheets

(51) Int. Cl.
H04W 36/22 (2009.01)
H04L 12/24 (2006.01)
H04W 36/24 (2009.01)
H04W 36/00 (2009.01)
H04L 12/26 (2006.01)
H04W 88/06 (2009.01)
H04N 21/6405 (2011.01)

(52) U.S. Cl.
CPC ....... *H04W 36/0069* (2018.08); *H04W 36/22* (2013.01); *H04W 36/245* (2013.01); *H04L 43/0882* (2013.01); *H04N 21/6405* (2013.01); *H04W 88/06* (2013.01)

(56) References Cited

U.S. PATENT DOCUMENTS

| | | |
|---|---|---|
| 8,804,721 B2 | 8/2014 | He et al. |
| 8,874,781 B2 | 10/2014 | Das et al. |
| 9,030,988 B2 | 5/2015 | Sayeed et al. |
| 9,064,011 B2 | 6/2015 | Maharajh et al. |
| 9,072,005 B2 | 6/2015 | Walker et al. |
| 9,154,824 B2 | 10/2015 | Wiser et al. |
| 9,191,922 B2 | 11/2015 | Anchan et al. |
| 9,226,265 B2 | 12/2015 | Gupta et al. |
| 9,326,052 B2 | 4/2016 | Rao et al. |
| 9,386,425 B2 | 7/2016 | Yu et al. |
| 2006/0050736 A1 | 3/2006 | Segel |
| 2007/0061831 A1 | 3/2007 | Savoor et al. |
| 2007/0168523 A1 | 7/2007 | Jiang et al. |
| 2007/0277205 A1 | 11/2007 | Grannan |
| 2008/0198848 A1 | 8/2008 | Yamagishi et al. |
| 2010/0017815 A1 | 1/2010 | Más Ivars et al. |
| 2012/0051275 A1 | 3/2012 | Alex et al. |
| 2013/0028118 A1 | 1/2013 | Cherian et al. |
| 2013/0031210 A1 | 1/2013 | Redmond |
| 2013/0042277 A1 | 2/2013 | Hymel et al. |
| 2013/0081072 A1 | 3/2013 | Alward et al. |
| 2013/0294321 A1 | 11/2013 | Wang et al. |
| 2014/0113600 A1 | 4/2014 | El Gamal et al. |
| 2015/0095955 A1 | 4/2015 | Singh et al. |
| 2015/0156249 A1 | 6/2015 | Draznin et al. |
| 2016/0286457 A1 | 9/2016 | O'hare et al. |
| 2018/0063760 A1 | 3/2018 | Chakraborty et al. |

OTHER PUBLICATIONS

Chowdhury, Mostafa Z. et al., "Quality-Aware Popularity Based Bandwidth Allocation for Scalable Video Broadcast over Wireless Access Networks", Internet Technology Journal (translated), 16.6, 2015, 1089-1098.

Sen, Sayandeep et al., "Scalable WiFi Media Delivery through Adaptive Broadcasts", NSDI, 2010, 14 pages.

Von Fuchs, Teresa, "MediaFLO adds three new all-news-all-the-time channels", TC, techcrunch.com, Aug. 26, 2008.

Zhang, Yang et al., "Offloading in Mobile Cloudlet Systems with Intermittent Connectivity", IEEE Transactions on Mobile Computing 14.12, 2015, 2516-2529.

200

300

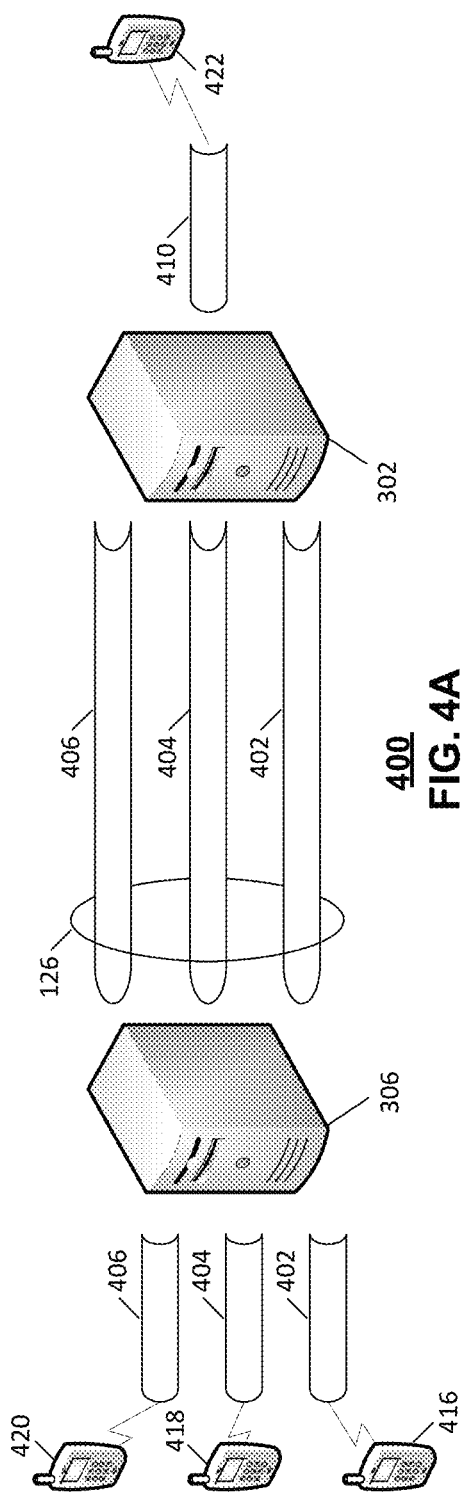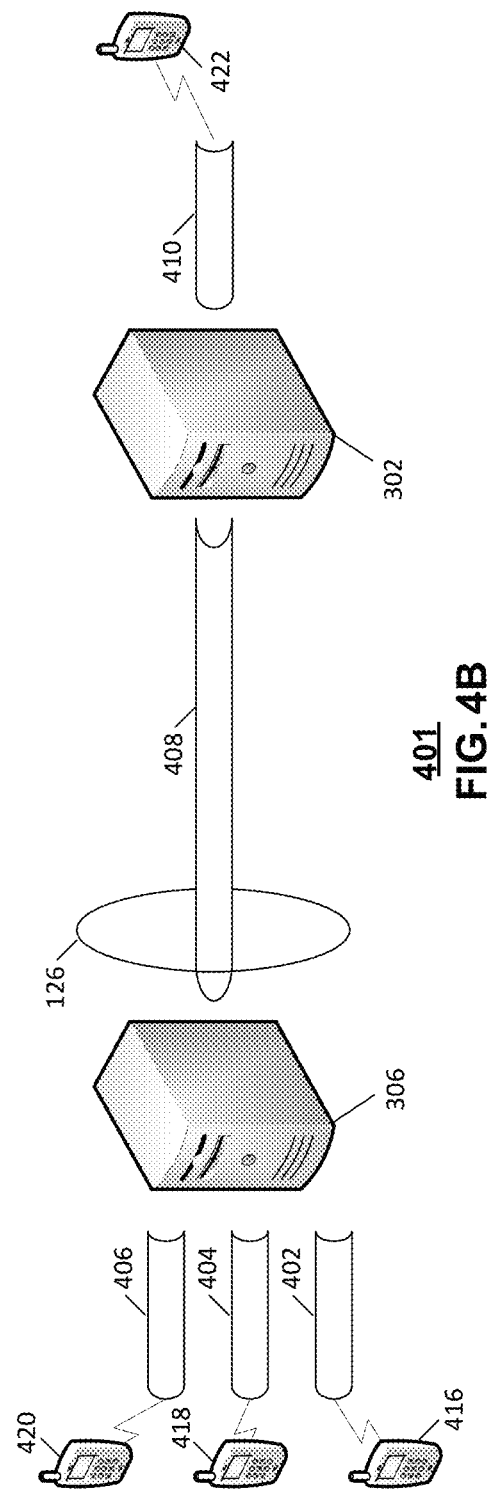

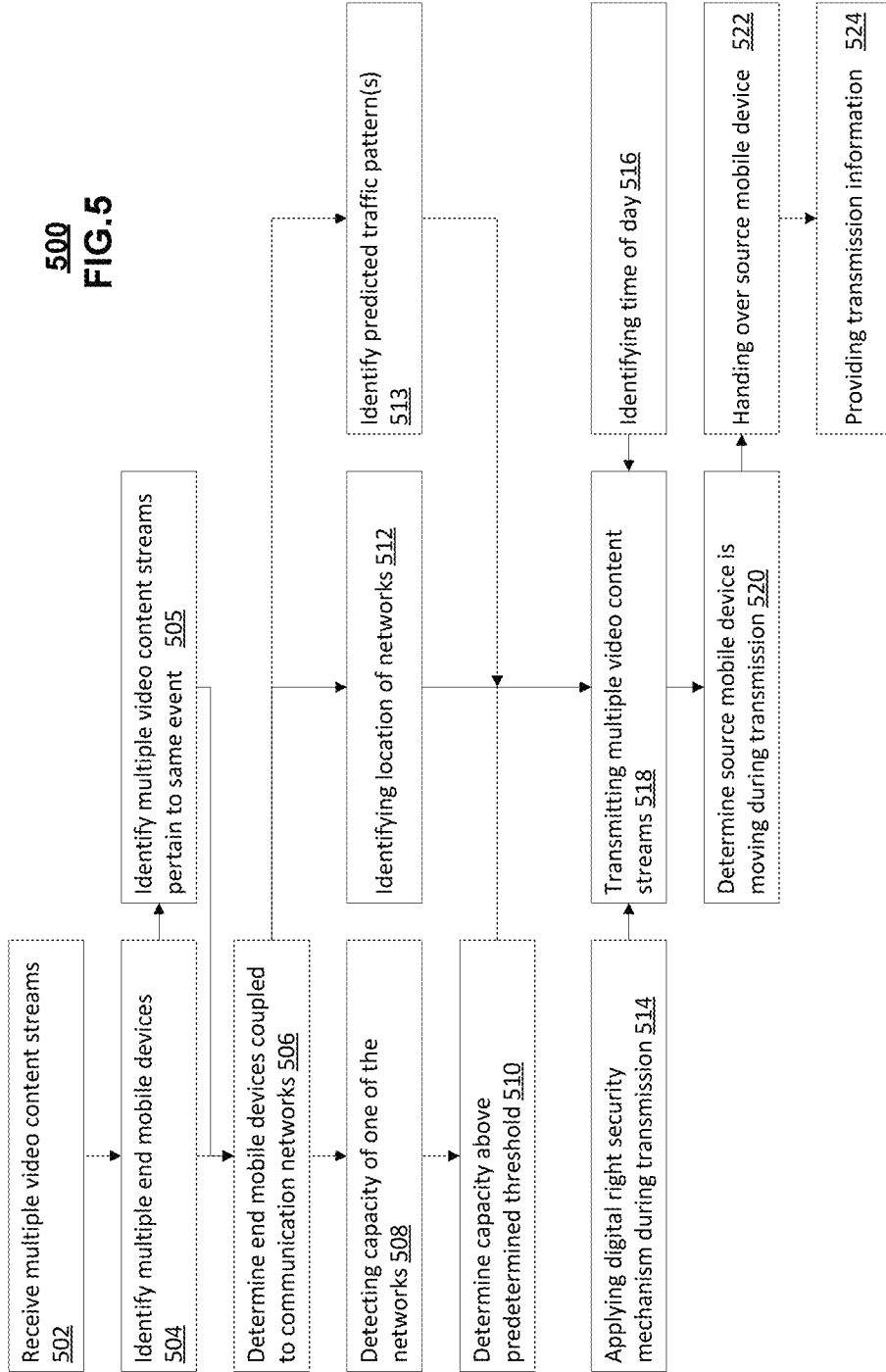

METHODS AND SYSTEM FOR PROVIDING MULTIPLE VIDEO CONTENT STREAMS OVER DIFFERENT COMMUNICATION NETWORKS

CROSS REFERENCE TO RELATED APPLICATIONS

This application is a continuation of U.S. patent application Ser. No. 15/250,361 filed on Aug. 29, 2016. The contents of each of the foregoing is/are hereby incorporated by reference into this application as if set forth herein in full.

FIELD OF THE DISCLOSURE

The subject disclosure relates to methods and systems for providing multiple video content streams over different communication networks.

BACKGROUND

The modern Internet includes broadband, high speed networks that can carry large amounts of video content across networks. The benefits of the high speed networks include allowing individuals to provide streaming live video content from mobile devices to others via the networks. In addition, edge networks such as satellite networks, cellular networks, and WiFi networks have grown in capacity to upload and download large amounts of video content streamed from, and accessed by, mobile devices.

BRIEF DESCRIPTION OF THE DRAWINGS

Reference will now be made to the accompanying drawings, which are not necessarily drawn to scale, and wherein:

FIGS. 1-3, and FIGS. 4A-4B depict illustrative embodiments of systems for providing multiple video content streams over different communication networks;

FIG. 5 depicts an illustrative embodiment of a method used in portions of the system described in FIGS. 1-3 and FIGS. 4A-4B;

DETAILED DESCRIPTION

Figure 1:
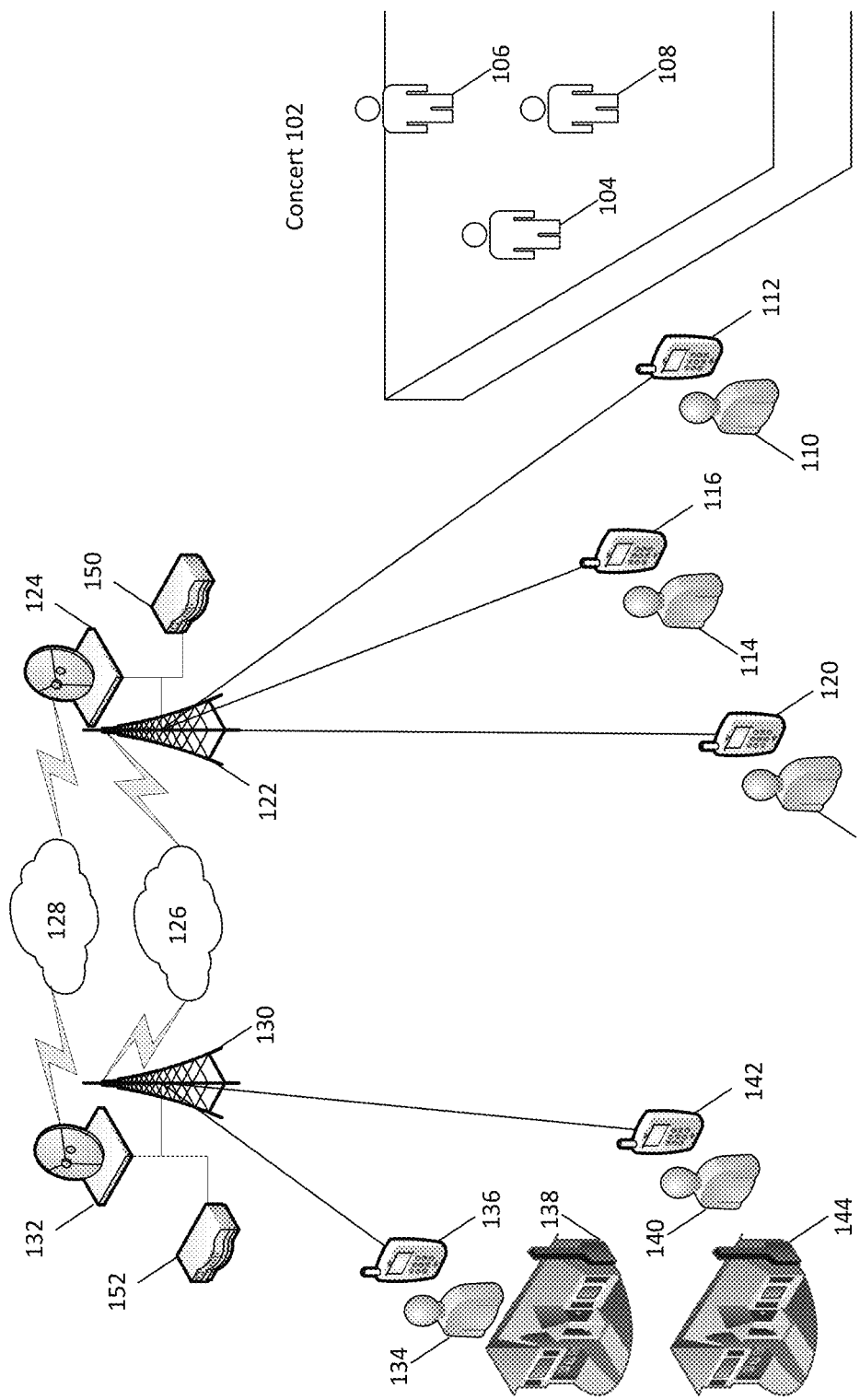

The subject disclosure describes, among other things, illustrative embodiments for providing multiple video content streams over different communication networks. Embodiment can include receiving a video content stream from each of multiple source mobile devices resulting in multiple video content streams. Further embodiments can include identifying that the multiple video content streams pertain to a same event and identifying an end mobile device for each of the multiple video content streams resulting in multiple end mobile devices. Additional embodiments can include determining a portion of the multiple end mobile devices are communicatively coupled to a first wireless communication network and to a second wireless communication network. Also, embodiments can include identifying a predicted traffic pattern on the first wireless communication network based on the multiple video content streams pertaining to the same event and that the portion of the multiple end mobile devices are communicatively coupled to the first wireless communication network. Further embodiments can include transmitting a first portion of the multiple video content streams across the first wireless communication network and transmitting a second portion of the multiple video content streams across the second wireless communication network according to the predicted traffic pattern. Other embodiments are described in the subject disclosure.

One or more aspects of the subject disclosure include a device comprising a processing system including a processor and a memory that stores executable instructions that, when executed by the processing system, facilitate performance of operations. The operations can include receiving a video content stream from each multiple source mobile devices resulting in multiple video content streams. Further operations can include identifying an end mobile device for each of the multiple video content streams resulting in multiple end mobile devices. Additional operations can include determining a portion of the multiple end mobile devices are communicatively coupled to a first wireless communication network and to a second wireless communication network. Also, the operations can include detecting a capacity of the first wireless communication network and transmitting a first portion of the multiple video content streams across the first wireless communication network and transmitting a second portion of the multiple video content streams across the second wireless communication network responsive to determining that the capacity of the first wireless communication network is above a predetermined threshold.

One or more aspects of the subject disclosure include a machine-readable storage medium, comprising executable instructions that, when executed by a processing system including a processor, facilitate performance of operations. The operations can include receiving a video content stream from each of multiple source mobile devices resulting in multiple video content streams. Further operations can include identifying that the multiple video content streams pertain to a same event and identifying an end mobile device for each of the multiple video content streams resulting in multiple end mobile devices. Additional operations can include determining a portion of the multiple end mobile devices are communicatively coupled to a first wireless communication network and to a second wireless communication network. Also, operations can include identifying a predicted traffic pattern on the first wireless communication network based on the multiple video content streams pertaining to the same event and that the portion of the multiple end mobile devices are communicatively coupled to the first wireless communication network. Further operations can include transmitting a first portion of the multiple video content streams across the first wireless communication network and transmitting a second portion of the multiple of video content streams across the second wireless communication network according to the predicted traffic pattern.

One or more aspects of the subject disclosure include a method. The method can include receiving, by a processing system including a processor, a video content stream from each of multiple source mobile devices resulting in multiple video content streams. Further, the method can include identifying, by the processing system, an end mobile device for each of the multiple video content streams resulting in multiple end mobile devices. In addition, the method can include determining, by the processing system, a portion of the multiple end mobile devices are communicatively coupled to a first wireless communication network and to a second wireless communication network. Also, the method can include identifying, by the processing system, a time of day, a first location of the first wireless communication network and a second location of the second wireless communication network. Further, the method can include transmitting, by the processing system, a first portion of the multiple video content streams across the first wireless communication network according to the time of day and the first location and transmitting a second portion of the multiple video content streams across the second wireless communication network according to the time of day and the second location.

FIG. 1 depicts an illustrative embodiment of system 100 for providing multiple video content streams over different communication networks. In one or more embodiments, system 100 includes users 110, 114, 118 attending a concert 102 of musicians 104, 106, 108. The users 110, 114, 118 can capture video content of the concert 102 with their mobile devices 112, 116, 120. Further, the mobile devices 112, 116, 120 can transmit the captured video content as real-time live video content streams to the mobile device 136, 142 of users 134, 140 over different communication networks 126, 128. The mobile devices 112, 116, 120 can also be called source mobile devices. Further, the mobile devices 136, 142 can also be called end mobile devices.

In one or more embodiments, mobile devices 112, 116, 120 are communicatively coupled to a cellular network 126 via a radio tower 122 of a base station across an edge wireless communication network. The edge wireless communication network can be comprised of network devices such as the mobile devices 112, 116, 120, radio tower 122 and the base station controller 150. Further, mobile devices 136, 142 are communicatively coupled to a radio tower 130 of another base station across another edge wireless communication network. This other edge wireless communication network can be comprised of network devices such as the mobile devices 136, 142, radio tower 130, and base station controller 152. The radio towers 122, 130 of the base stations can be coupled over the cellular network 126. In other embodiments, a satellite transceiver 124 is communicatively coupled to the radio tower 122 (via base station controller 150 or some other network device) and a satellite transceiver 132 is communicatively coupled to the radio tower 130 (via base station controller 153 or some other network device). Further, the satellite transceivers 124, 132 can be coupled over a satellite network 128.

In one or more embodiments, the radio tower 122 can receive a video content stream from each of the mobile devices 112, 116, 120. A base station controller 150 can determine whether to transmit the multiple video content streams to the mobile devices 136, 142, over the cellular network 126 or over the satellite network 128. Transmission of the video content streams by the base station controller, or under the direction of a network device communicatively coupled to the base station controller, can be responsive to video content requests from the mobile devices 136, 142 by their users 134, 140. In some embodiments, all or a portion of the video content streams can be transmitted over the cellular network 126 and received by another base station controller 152 that can direct the video content steams to radio tower 130 to be sent to the mobile devices 136, 142. In other embodiments, all or a portion of the video content streams can be transmitted over the satellite network 128 and received by satellite transceiver 132, and another base station controller 152 can direct the video content steams to radio tower 130 to be sent to the mobile devices 136, 142.

In one or more embodiments, users 134, 140 can be at a residential premises 138, 144. In other embodiments, users 134, 140 can be are receiving on their mobile devices 136, 142 the multiple video content streams from the mobile devices 112, 116, 120 while in transit or in motion. The mobile devices 112, 116, 120, 136, 142 can be smartphones, tablet computers, laptop computers, wearable devices or other portable communication devices.

Figure 2:
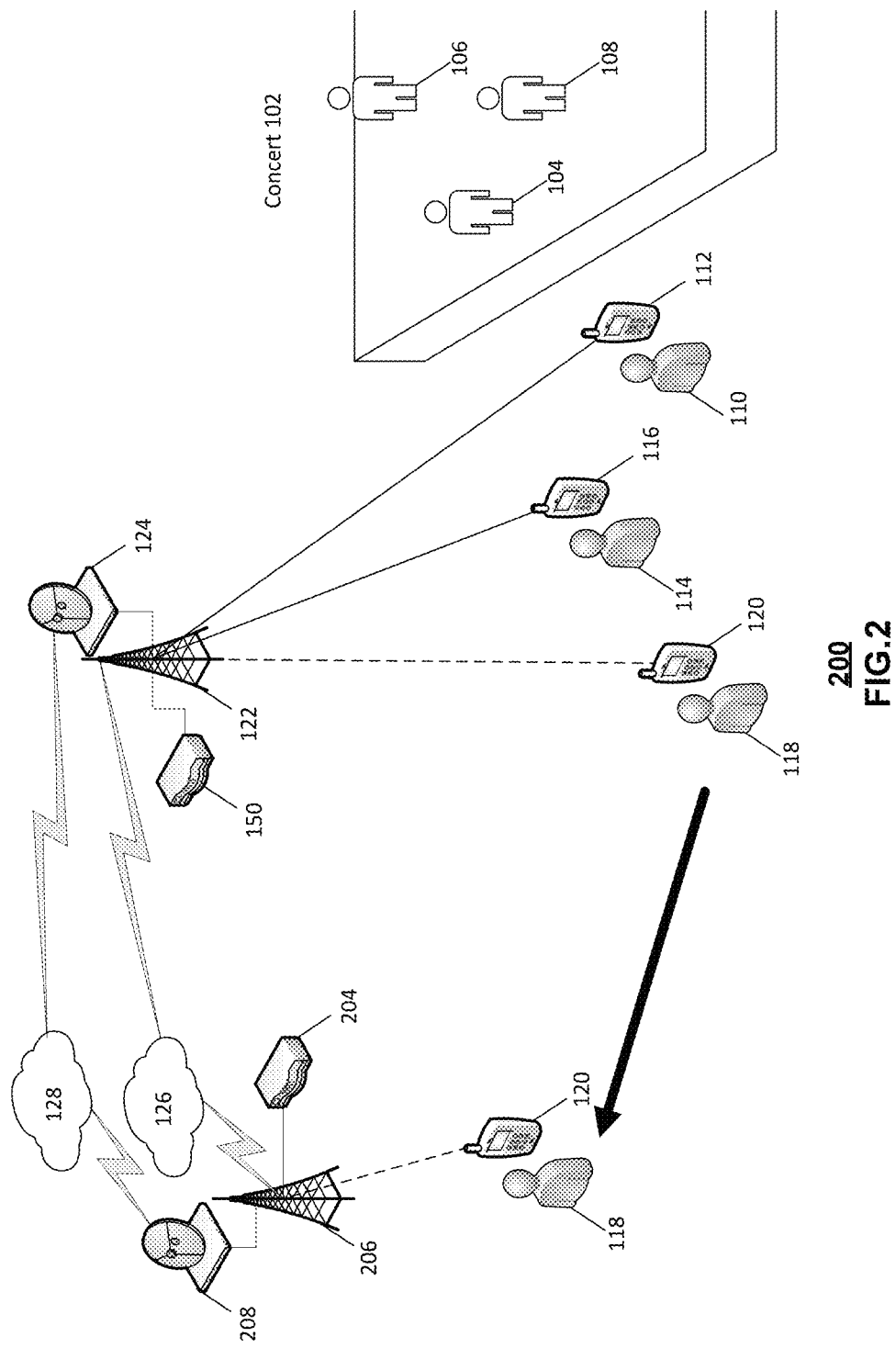

FIG. 2 depicts an illustrative embodiment of system 200 for providing multiple video content streams over different communication networks. In one or more embodiments, user 118 is capturing video content of the concert 102 and transmitting the captured video content to the radio tower 122. Further, base station controller directs (or receives instructions from a network device to direct) the received video content stream to be transmitted over the satellite network 128 via satellite transceiver 124. Radio tower 122 captures data including identification information from many different mobile devices communicatively coupled to its cellular network. Further, radio tower 122 captures data including identification information from the mobile devices for a cellular site of a cellular network.

In one or more embodiments, user 118 may change location while transmitting the captured video content stream such that user 118 and mobile device 120 are located in another cellular site with a radio tower 206 and a base station controller 204. Management entities of the cellular network, including base station controller 150, base station controller 204, and other network devices, detect that mobile device 120 is moving or has moved to a new cellular site during transmission of the captured video content stream. Further, the management entities of the cellular network, including base station controller 150, base station controller 204, and other network devices hand over control of the mobile device 120 from radio tower 122 to radio tower 206. Handing over control can include radio tower 206 exchanging data (i.e. reception and transmission) from the mobile device 120 and base station controller 204 managing the reception of data from, and any transmission of data to, mobile device 120.

Thus, once control of mobile devices 120 is handed over to the base station controller 204, radio tower 206 then receives the captured video content stream from the mobile device 120. Base station controller 204 can control (or is directed to control by a network device) the transmission of the captured video content stream. Further, the base station controller 150, or network device managing base station controller 150, can provide base station controller 204, or a network device managing base station controller 204, with transmission information regarding the captured video content stream. Such transmission information can include an indication whether the captured video content stream is being transmitted over the cellular network 126 or a satellite network 128. For example, the captured video content stream may have been transmitted over the satellite network 128 while the mobile device 120 was in the previous cellular network with the radio tower 122. Therefore, the base station controller 204 directs (or is provided instructions from a network device to direct) the video content stream received from mobile device 120 at the radio tower 206 to the satellite transceiver 208 to be sent over the satellite network 128.

Figure 3:
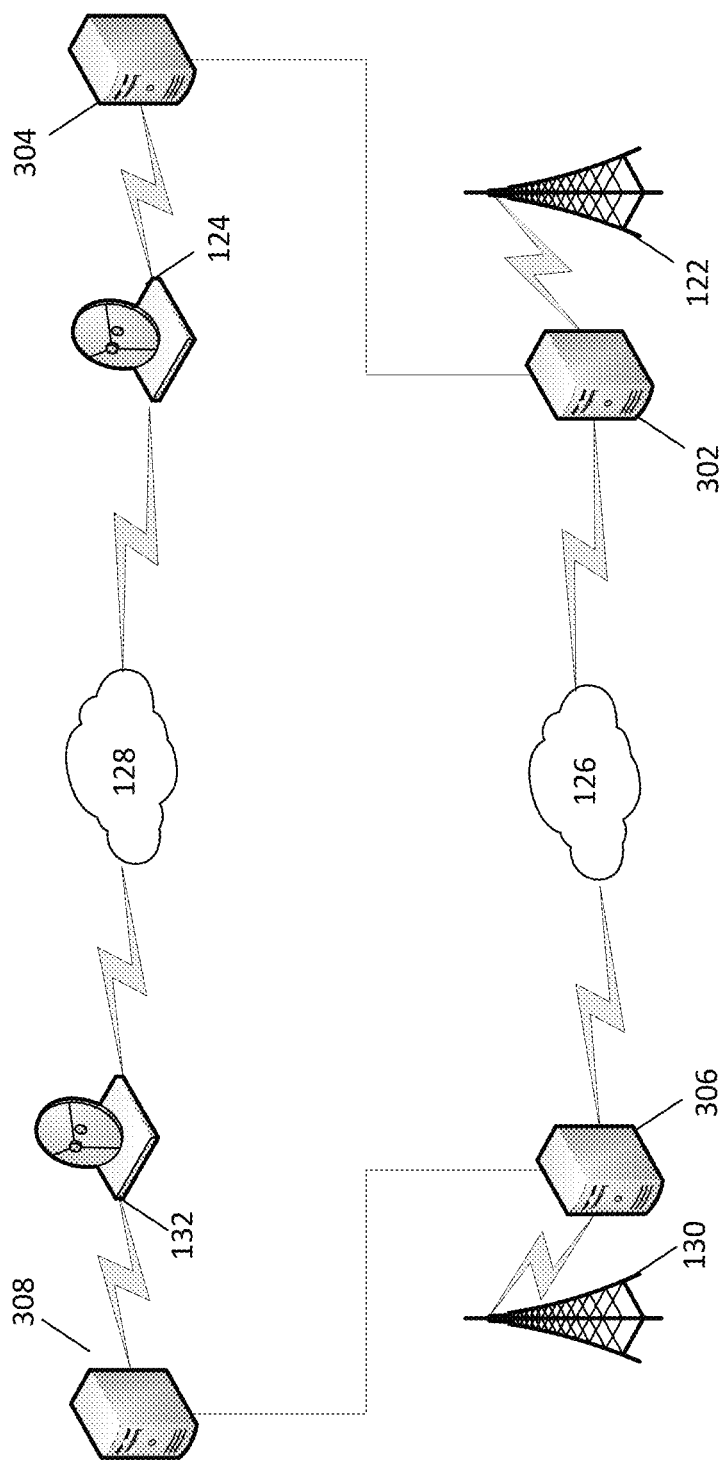

FIG. 3 depicts an illustrative embodiment of a system 300 for providing multiple video content streams over different communication networks. In one or more embodiments, radio tower 122 at a base station can receive multiple video content streams of an event from multiple mobile devices 112, 116, 120. Further, mobile devices 136, 142 are accessing the multiple video content streams. In some embodiments, existing voice and data traffic can traverse the cellular network 126 when the multiple video content streams are received by radio tower 122. A network device 302 can detect the capacity of the cellular network 126 given the existing voice and data traffic traversing it. Further, the network device 302 can determine that providing the multiple video content streams over the cellular network 126 can overload the cellular network 126. Such an overloaded cellular network 126 can diminish quality of the video to the point that the video content is unviewable (e.g. pixelization of portions of images resolution quality is too low to enjoy the video content stream, etc.), and/or there may be significant delays in providing the video content streams.

In one or more embodiments, the network device 302 can exchange messages, signals, or other communications with network device 304 communicatively coupled to the satellite transceiver 124. The network device 304 can detect the capacity of satellite network 128 given existing voice and data traffic traversing it and detect whether transmitting the multiple video content streams would overload the satellite network 128 similar to network device 302 detecting the capacity of cellular network 126.

In one or more embodiments, network device 306 is communicatively coupled to the cellular network 126 and radio tower 130. Further, radio tower 130 is communicatively coupled to multiple mobile devices. Also, the network device 306 can identify the mobile devices communicatively coupled to radio tower 130. Mobile device 136, 142 can provide identification information to the radio tower 130 that is relayed to network device 306. In addition, network device 306 can process the identification of the mobile devices 136, 142 to determine the number of mobile devices communicatively coupled to radio tower 130. Further, network device 306 exchanges messages, signals, or other communications with network device 308 communicatively coupled to the satellite transceiver 132. In addition, network device 302 can exchange messages, signals, or other communications with the network device 306 that includes identification information (or the number of) for the end mobile devices accessing each of the multiple video content streams. Also, the network device 306 can detect and identify whether some of the end mobile devices accessing the multiple video content streams are coupled to the edge wireless communication network attached to the radio tower 130 according to the identification information for the end mobile devices. If so, then the network device 306 can send a message or signal to network device 302 indicating that some of the end mobile devices are coupled to its edge wireless communication network and that network device 306 is communicatively coupled to satellite network 128.

In one or more embodiments, in response to receiving such a message or signal, network device 302 identifies that these end mobile devices are a portion of mobile devices coupled to the edge wireless communication network attached to the radio tower 130. Thus, the network device 302 sends the multiple video content streams for the portion of identified end mobile devices over the satellite network 128. Such a course of action prevents the network device 302 from overloading the cellular network 126 with all the multiple video content streams causing diminished video content quality or transmission delays. Further, the network device 302 can transmit the multiple video content streams to a remaining portion of end mobile device over the cellular network 126.

In one or more embodiments, the network device 308 receives the multiple video content steams from the satellite transceiver 132 over the satellite network 128. Further, network device 308 transmits the multiple video content streams to the radio tower 130 via network device 306 to be sent to end mobile devices 136, 142.

FIG. 4A depicts an illustrative embodiment of system 400 for providing multiple video content streams over different communication networks. In one or more embodiments, a network device 302 can receive a video content streams 410, from a source mobile device 422 that is to be sent to multiple end mobile devices 416, 418, 420. Further, network device 302 can be coupled to cellular network 126. Under a unicast protocol, responsive to receiving a request to access the video content stream 410 from each of the multiple end mobile devices 416, 418, 420, the network device 302 sends three copies 402, 404, 406 over the cellular network 126 to network device 306. Further, network device 306 routes each video content stream 402, 404, 406 to end mobile devices 416, 418, 420. However, delivering video content stream 410 under a unicast protocol can generate copies 402, 404, 406 of the same video content stream 410, thereby creating traffic congestion in the cellular network 126.

Referring to FIG. 4B, in one or more embodiments, network device 302 can determine that the end mobile devices 416, 418, 420 are communicatively coupled to network device 306. That is, network device 306 can exchange messages or signals to network device 302 that end mobile devices 416, 418, 420 are communicatively coupled to network device 306.

In one or more embodiments, the network device 302 can detect the capacity of the cellular network 126 given existing voice and data traffic traversing it. If adding the multiple video content streams 402, 404, 406 would overload the cellular network, thereby diminishing the quality of the multiple video content streams and/or adding significant delays in transmitting the multiple video content streams to end mobile devices 416, 418, 420, then the network device 302 can send one video content stream 410 according to a multicast protocol. Thus, the network device 302 sends one copy 408 of video content stream 410 across cellular network 126 according to a multicast protocol, thereby adding significantly less traffic to cellular network 126 than according to a unicast protocol. Further, responsive to receiving the video content stream 408 under the multicast protocol, network device 306 sends copies 402, 404, 406 of the video content stream 408 to each of the end mobile devices 416, 418, 420.

Although video content stream 408 is delivered over a cellular network 126 according to a multicast protocol, in other embodiments, video content stream 408 can be delivered over other types of networks, including a satellite network 128, according to a multicast protocol.

FIG. 5 depicts an illustrative embodiment of a method 500 used by systems 100, 200, 300, 400 for providing multiple video content streams over different communication networks. At a step 502, the method 500 can include a network device receiving a video content stream from each of multiple source mobile devices resulting in multiple video content streams. Further, at step 504, the method 500 can include the network device identifying an end mobile device for each of the multiple video content streams resulting in multiple end mobile devices. Additionally, at a step 505, the method 500 can also include the network device identifying that the multiple video content streams pertain to a same event. At a step 506, the method 500 can also include the network device determining a portion of the multiple end mobile devices are communicatively coupled to a first wireless communication network and to a second wireless communication network. The first wireless communication network can be, or a portion of, a cellular network such as an edge cellular network. The second wireless communication network can be a satellite network. Further, at a step 508, the method 500 can include the network device detecting a capacity of one of the first wireless communication network or the second wireless communication network. For example, the network device can be configured to detect the capacity of either the cellular network or the satellite network.

In addition, at a step 510, the method can include the network device determining that the capacity of the first wireless communication network is above a predetermined threshold. The predetermined threshold can be configured by network operations personnel. Further, the predetermined threshold can be determined by automatically based on historical traffic flow on the first wireless communication network. For example, during the evening between 4 pm-6 pm every weeknight, the cellular network may have a high traffic flow due to commuters on public transportation routes in a metropolitan area accessing data over the cellular network. Thus, the predetermined threshold can take into account the time of day and historical trends in traffic flow to calculate the predetermined threshold. Another example can be that the network device can communicate with other network devices to understand the number of active mobile devices on the cellular network and based average data consumption for a mobile device, calculate the predetermined threshold.

At a step 518, the method 500 can include the network device transmitting a first portion of the multiple video content streams across the first wireless communication network and transmitting a second portion of the multiple video content streams across the second wireless communication network responsive to determining that the capacity of the first wireless communication network is above a predetermined threshold. This allows for the first wireless communication network not be overloaded by the multiple video content streams, thereby diminishing the quality of the video content streams or causing significant delays in transmitting the video content streams to the end mobile devices.

At a step 512, the method 500 can include network device identifying a first location of the first wireless communication network (e.g. cellular network), or a portion thereof, and a second location of the second wireless communication network (e.g. satellite network), or a portion thereof. For example, if the cellular network is along public transportation bus or train route, then the network device can transmit a portion of the multiple video content stream over the cellular network and a remaining portion over the satellite network. The network device can be configured for taking into account of the location of either the first wireless communication network or the second wireless communication network because, network operators may anticipate more traffic over the cellular network in proximity to public transportation routes.

At a step 512, the method 500 can include the network device identifying a predicted traffic pattern on the first wireless communication network based on the multiple video content streams pertaining to the same event and that the portion of the multiple end mobile devices are communicatively coupled to the first wireless communication network. For example, the network device may be given information from other network devices that the portion of end mobile devices are near a college campus. Further, historical data indicates that end mobile devices coupled to wireless networks near college campus access video content stream of events of the same type as the related to the received video content streams. In addition, the network device can be configured, automatically or manually by network personnel, to identify the predicted traffic pattern on the first wireless communication network based on the event type and the location of the portion of the end mobile devices. The predicted traffic pattern can indicate that if the multiple video content streams are transmitted over the first wireless communication network, then the first wireless communication network (e.g. cellular network) may be overloaded causing either diminished quality of, or significant delays in delivery of the video content streams.

At a step 516, the method 500 can also include the network device identifying a time of day. Based on the time of day, the network device can transmit a portion of the multiple video content stream over the cellular network and a remaining portion over the satellite network. For example, a network operator may anticipate that the cellular network more traffic over the cellular network during rush hour, commuter times (e.g. 7 am-9 am and 4 pm-6 pm) because more people are commuting on public transportation and such commuters access data while riding public transportation.

At a step 514, the method 500 can include the network device applying a digital right security mechanism to each video content stream of the first portion of the multiple video content streams over the first wireless communication network (e.g. cellular network) and/or applying the digital right security mechanism to each video content stream of the second portion of the multiple video content streams over the second wireless communication network (e.g. satellite network). For example, musicians 104, 106, 108 may allow users 110, 114, 118 to capture video content of their concert 102 and distribute the video content steams to other end mobile devices 136, 142. However, the musicians 104, 106, 108 may have an agreement with the network operator of the mobile devices 112, 116, 120, 136, 142 that such video content streams must be applied with digital right security mechanisms (password protection, time to live, encryption, biometric protection etc.), when delivered over communication networks 126, 128. In some embodiments, the network device can apply the digital right security mechanism. In other embodiments, the source mobile devices 112, 116, 120 can apply the digital right security mechanism.

At step 520, the method 500 can include the network device detecting that a source mobile device is moving to a new cellular site during transmission of a video content stream. The network device can be provided with information that the source mobile device is moving from a base station controller of a current cellular site to a new cellular site. Further, the network device has directed (a base station controller or some other network device) the transmission of the video content stream on either the first wireless communication network (e.g. cellular network) or the second wireless communication network (e.g. satellite network). Further, at a step 522, method 500 can include the network device directs handing over control of the transmission of the first video content stream by the source mobile device to a base station controller of the new cellular site. In addition, at a step 524, the method 500 can include the network device providing the base station controller of the new cellular site with transmission information regarding the video content stream. The transmission information can indicate whether the first video content stream was being transmitted over either the first wireless communication network or over the second wireless communication network. The transmission also indicates or directs the base station controller of the new cellular site to continue transmitting the video content stream over either the first wireless communication network or the second wireless communication network.

In some embodiments, the term network device may be a collection of separate physical devices that when combined perform certain network functions. For example, the base station controller 150 and network device 302 can be combined in one network device or the network device can refer to the collection of separate physical devices including network device 302 and base station controller 150.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
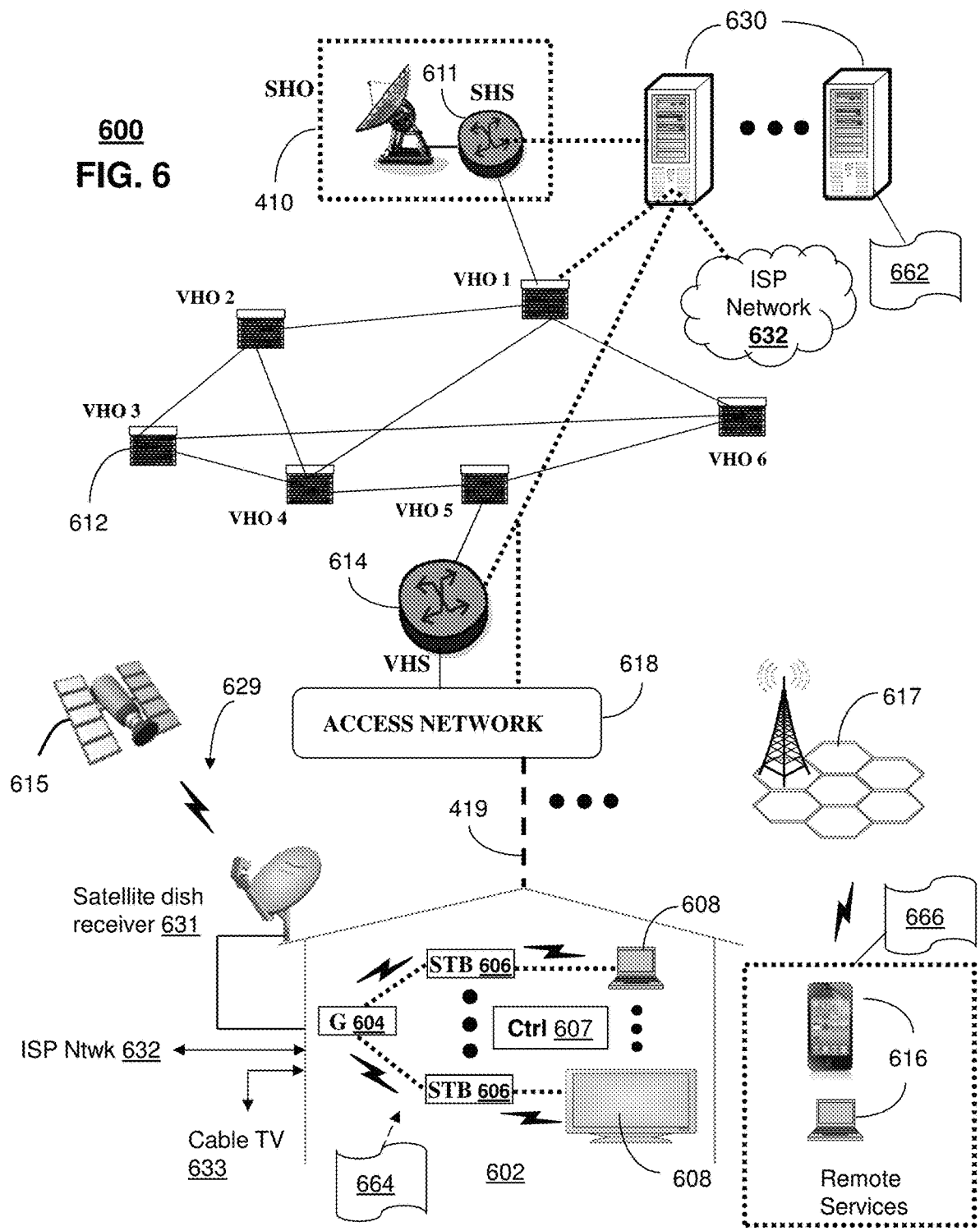
FIG. 6 depicts an illustrative embodiment of a communication system that manages the providing of multiple video content streams over different communication networks.

FIG. 6 depicts an illustrative embodiment of a first communication system 600 for delivering media content. The communication system 400 can represent an Internet Protocol Television (IPTV) media system. Communication system 600 can be overlaid or operably coupled with system 100, 200, 300, 400, 401 of FIGS. 1-3 and FIGS. 4A-4B as another representative embodiment of communication system 600. For instance, one or more devices illustrated in the communication system 600 of FIG. 6 can receive video content streams from multiple source mobile devices and identify that the video content streams pertain to a same event. Further, the devices can identify end mobile devices for the video content streams and determine a portion of the end mobile devices are coupled to one communication network and another communication network. In addition, the devices can identify a predicted traffic pattern on the first communication network based on the multiple video content streams pertaining to the same event and that the portion of the multiple end mobile devices are communicatively coupled to the first communication network. Also the device can transmit a portion of the video content streams across the first communication network and transmit another portion of the video content streams across the second communication network according to the predicted traffic pattern.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a network device (herein referred to as the network device 630) as described in FIGS. 1-3, FIGS. 4A-4B, and, FIG. 5. The network device 630 can use computing and communication technology to perform function 662, which can include among other things, the techniques described by method 500 of FIG. 5 for delivering multiple video content streams over different communication networks. For instance, function 662 of network device 630 can be similar to the functions described for network devices of FIGS. 1-3 and FIGS. 4A-4B in accordance with method 500 in FIG. 5. The media processors 606 and wireless communication devices 616 can be provisioned with software functions 664 and 666, respectively, to utilize the services of network device 630. For instance, functions 664 and 666 of media processors 606 and wireless communication devices 616 can be similar to the functions described for the communication devices 112, 116, 120, 136, 142 of FIG. 1 in accordance with method 500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
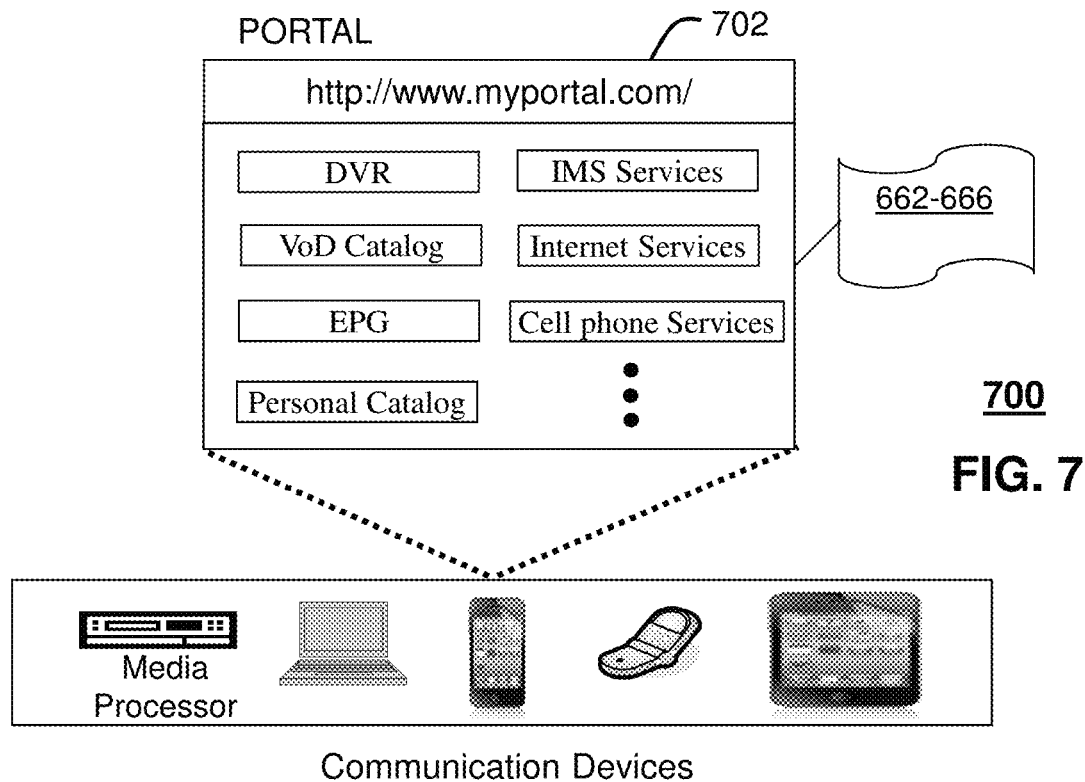
FIG. 7 depicts an illustrative embodiment of a web portal for interacting with the communication systems for providing multiple video content streams over different communication networks.

FIG. 7 depicts an illustrative embodiment of a web portal 702 of a communication system 700. Communication system 700 can be overlaid or operably coupled with systems 100, 200, 300, 400, 401 of FIGS. 1-3 and FIGS. 4A-4B, and/or communication system 60 as another representative embodiment of systems 100, 200, 300, 400, 401 of FIGS. 1-3, FIGS. 4A-4B, and/or communication system 600. The web portal 702 can be used for managing services of systems 100, 200, 300, 400, 401 of FIGS. 1-3, FIGS. 4A-4B and communication system 600. A web page of the web portal 702 can be accessed by a Uniform Resource Locator (URL) with an Internet browser using an Internet-capable communication device such as those described in FIGS. 1-3, FIGS. 4A-4B and FIG. 6. The web portal 702 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 702 can also be used for provisioning IMS services described earlier, provisioning Internet services, provisioning cellular phone services, and so on.

The web portal 702 can further be utilized to manage and provision software applications 662-666 to adapt these applications as may be desired by subscribers and/or service providers of systems 100, 200, 300, 400, 401 of FIGS. 1-3, FIGS. 4A-4B and communication system 600. For instance, users of the services provided by network devices 302-308, 630 can log into their on-line accounts and provision the network devices 302-308 or network device 630 to deliver one or more video content streams to an end mobile device of an upcoming event (e.g. concert, sports game, etc.), and so on. Service providers can log onto an administrator account to provision, monitor and/or maintain the systems 100, 200, 300, 400, 401 of FIGS. 1-3, and FIGS. 4A-4B or network device 630. This can include configuring parameters for transmitting a portion of multiple video content steams over different communication networks (as opposed to one communication network). These parameters can include the predetermined threshold of the capacity of either the first wireless communication network or a second wireless communication network as well as time of day and the location of either the first wireless communication network or the second wireless communication network.

Figure 8:
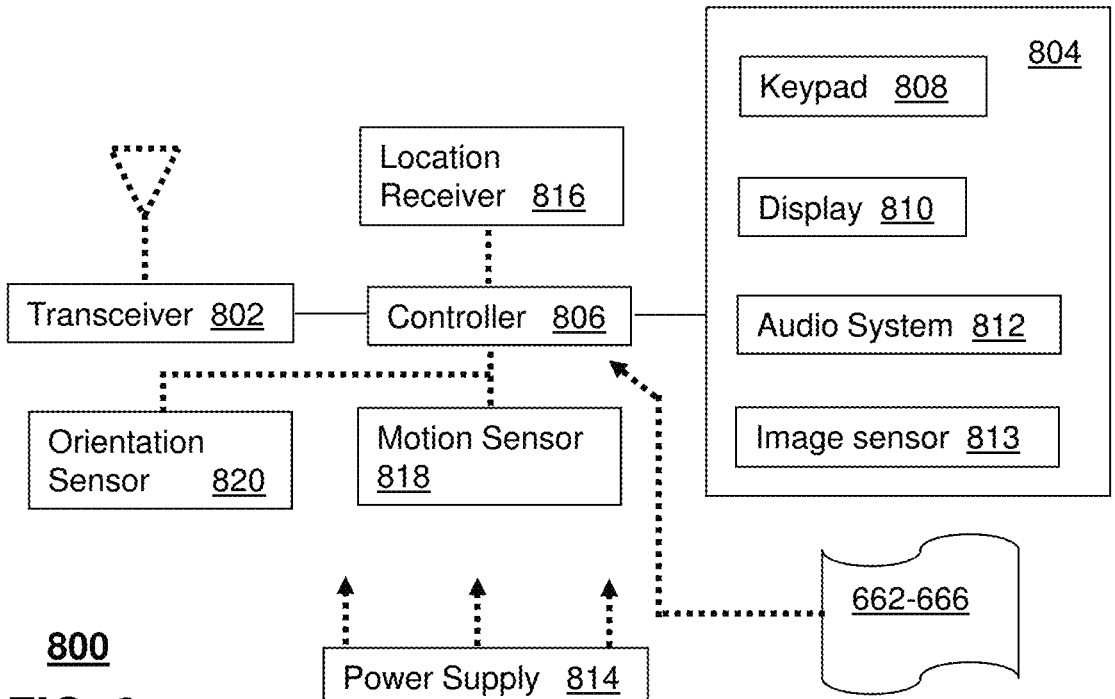
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-3, FIGS. 4A-4B, and FIG. 6 and can be configured to perform portions of method 500 of FIG. 5.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of mobile devices 112, 116, 120, radio towers 122, 130, satellite transceivers 124, 132, mobile devices 136, 142, base station controllers 150, 152, 204, network devices 302, 304, 306, 308, mobile devices 416, 418, 420, 422, the media processor 606, the media devices 608, or the portable communication devices 616 of FIG. 6. It will be appreciated that the communication device 800 can also represent other devices that can operate in systems 100, 200, 300, 400, 401 of FIGS. 1-3, FIGS. 4A-4B, communication system 600 of FIG. 6 such as a gaming console and a media player. In addition, the controller 806 can be adapted in various embodiments to perform the functions 662-666.

Upon reviewing the aforementioned embodiments, it would be evident to an artisan with ordinary skill in the art that said embodiments can be modified, reduced, or enhanced without departing from the scope of the claims described below. For example, a person of ordinary skill in the art would understand that portions of or entire embodiments can be combined with portions of or entire other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
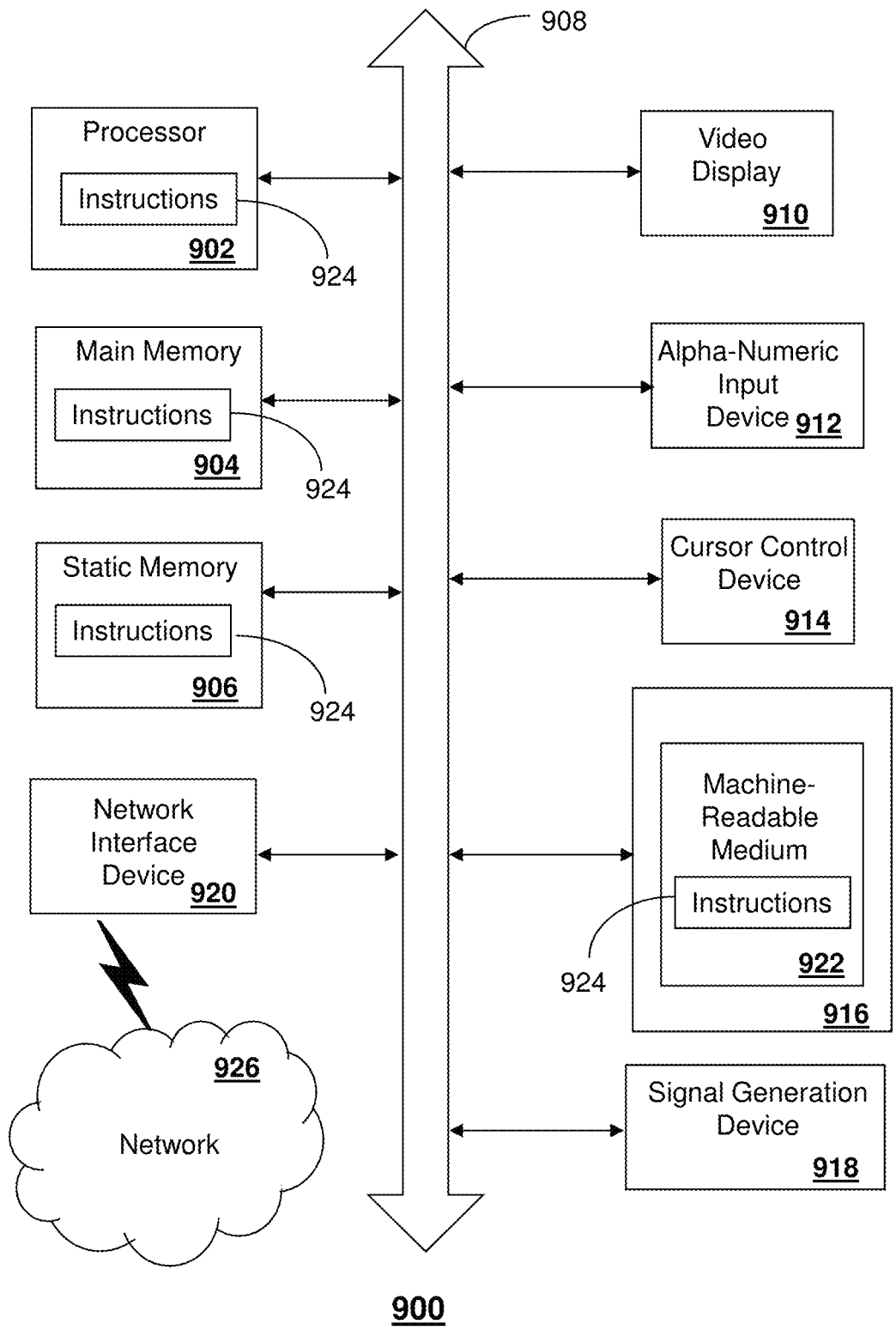
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the network device 630, the media processor 606, mobile devices 112, 116, 120, radio towers 122, 130, satellite transceivers 124, 132, mobile devices 136, 142, base station controllers 150, 152, 204, network devices 302, 304, 306, 308, mobile devices 416, 418, 420, 422 and other devices of FIGS. 1-3, FIGS. 4A-4B, and FIGS. 5-8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device

920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
 a processing system including a processor; and
 a memory that stores executable instructions that, when executed by the processing system, facilitate performance of operations, comprising:
  obtaining a plurality of video content streams;
  detecting a capacity of a first wireless communication network, wherein the detecting of the capacity of the first wireless communication network comprises identifying a number of active mobile devices on the first wireless communication network;
  determining a threshold according to the number of active mobile devices and an average data consumption for a mobile device; and
  transmitting a first portion of the plurality of video content streams across the first wireless communication network and transmitting a second portion of the plurality of video content streams across a second wireless communication network responsive to determining that the capacity of the first wireless communication network is above the threshold.

2. The device of claim 1, wherein the first wireless communication network is a cellular network and the second wireless communication network is a satellite network.

3. The device of claim 1, wherein each of the plurality of video content streams is a live video content stream of an event.

4. The device of claim 1, wherein the transmitting of the first portion of the plurality of video content streams further comprises transmitting the first portion of the plurality of video content streams according to a multicast protocol.

5. The device of claim 1, wherein the transmitting of the second portion of the plurality of video content streams further comprises transmitting the second portion of the plurality of video content streams according to a multicast protocol.

6. The device of claim 1, wherein the operations further comprise:
 detecting that a first source mobile device is moving to a new cellular site during transmission of a first video content stream;
 handing over control of the transmission of the first video content stream by the first source mobile device to a controller of the new cellular site; and
 providing the controller of the new cellular site with transmission information regarding the first video content stream, wherein the transmission information indicates whether the first video content stream is transmitted over one of the first wireless communication network or over the second wireless communication network.

7. The device of claim 1, wherein the transmitting the first portion of the plurality of video content streams further comprises applying a digital right security mechanism to each video content stream of the first portion of the plurality of video content streams and wherein the transmitting the second portion of the plurality of video content streams further comprises applying the digital right security mechanism to each video content stream of the second portion of the plurality of video content streams.

8. A non-transitory, machine-readable storage medium, comprising executable instructions that, when executed by a processing system including a processor, facilitate performance of operations, comprising:
 obtaining a plurality of video content streams;
 detecting a capacity of a first wireless communication network, wherein the detecting of the capacity of the first wireless communication network comprises identifying a number of active mobile devices on the first wireless communication network;

determining a threshold according to the number of active mobile devices and an average data consumption for a mobile device; and transmitting a first portion of the plurality of video content streams across the first wireless communication network and transmitting a second portion of the plurality of video content streams across a second wireless communication network responsive to determining that the capacity of the first wireless communication network is above the threshold, wherein the first wireless communication network is a cellular network and the second wireless communication network is a satellite network.

9. The non-transitory, machine-readable storage medium of claim 8, wherein each of the plurality of video content streams is a live video content stream of an event.

10. The non-transitory, machine-readable storage medium of claim 8, wherein the transmitting of the first portion of the plurality of video content streams further comprises transmitting the first portion of the plurality of video content streams according to a multicast protocol.

11. The non-transitory, machine-readable storage medium of claim 8, wherein the transmitting of the second portion of the plurality of video content streams further comprises transmitting the second portion of the plurality of video content streams according to a multicast protocol.

12. The non-transitory, machine-readable storage medium of claim 8, wherein the operations further comprise:

detecting that a first source mobile device is moving to a new cellular site during transmission of a first video content stream; and handing over control of the transmission of the first video content stream by the first source mobile device to a controller of the new cellular site.

13. The non-transitory, machine-readable storage medium of claim 12, wherein the operations further comprise providing the controller of the new cellular site with transmission information regarding the first video content stream, wherein the transmission information indicates whether the first video content stream is transmitted over one of the first wireless communication network or over the second wireless communication network.

14. The non-transitory, machine-readable storage medium of claim 8, wherein the transmitting the first portion of the plurality of video content streams further comprises applying a digital right security mechanism to each video content stream of the first portion of the plurality of video content streams.

15. The non-transitory, machine-readable storage medium of claim 14, wherein the transmitting the second portion of the plurality of video content streams further comprises applying the digital right security mechanism to each video content stream of the second portion of the plurality of video content streams.

16. A method, comprising:

obtaining, by a processing system including a processor, a plurality of video content streams, wherein each of the plurality of video content streams is a live video content stream of an event;

detecting, by the processing system, a capacity of a first wireless communication network, wherein the detecting of the capacity of the first wireless communication network comprises identifying a number of active mobile devices on the first wireless communication network;

determining, by the processing system, a threshold according to the number of active mobile devices and an average data consumption for a mobile device; and transmitting, by the processing system, a first portion of the plurality of video content streams across the first wireless communication network and transmitting a second portion of the plurality of video content streams across a second wireless communication network responsive to determining that the capacity of the first wireless communication network is above the threshold.

17. The method of claim 16, wherein the first wireless communication network is a cellular network and the second wireless communication network is a satellite network.

18. The method of claim 16, wherein the transmitting of the first portion of the plurality of video content streams further comprises transmitting, by the processing system, the first portion of the plurality of video content streams according to a multicast protocol.

19. The method of claim 16, wherein the transmitting of the second portion of the plurality of video content streams further comprises transmitting, by the processing system, the second portion of the plurality of video content streams according to a multicast protocol.

20. The method of claim 16, comprising:

detecting, by the processing system, that a first source mobile device is moving to a new cellular site during transmission of a first video content stream;

handing, by the processing system, over control of the transmission of the first video content stream by the first source mobile device to a controller of the new cellular site; and providing, by the processing system, the controller of the new cellular site with transmission information regarding the first video content stream, wherein the transmission information indicates whether the first video content stream is transmitted over one of the first wireless communication network or over the second wireless communication network.

* * * * *